Sept. 2, 1941.   J. H. SCHARF   2,254,498
MAGNETIC DISPLAY DEVICE AND METHOD OF MAKING SAME
Filed Oct. 5, 1938   2 Sheets-Sheet 1
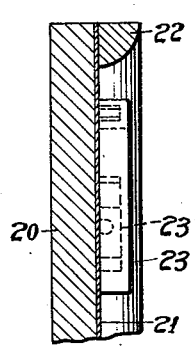
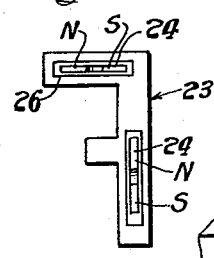
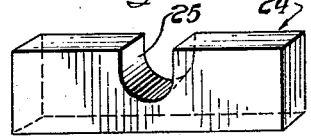
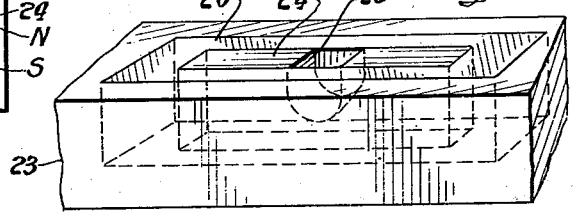
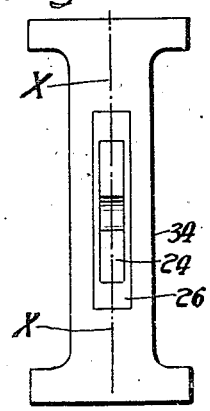
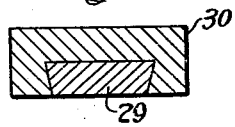
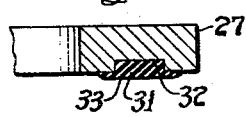
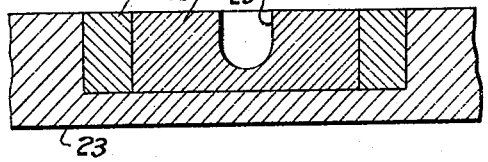
Witness:
E. Camporini
Inventor:
John H. Scharf
By: Frank J. Schraeder Jr.
Attorney Sept. 2, 1941. J. H. SCHARF 2,254,498
MAGNETIC DISPLAY DEVICE AND METHOD OF MAKING SAME
Filed Oct. 5, 1938 2 Sheets-Sheet 2
Fig. 11
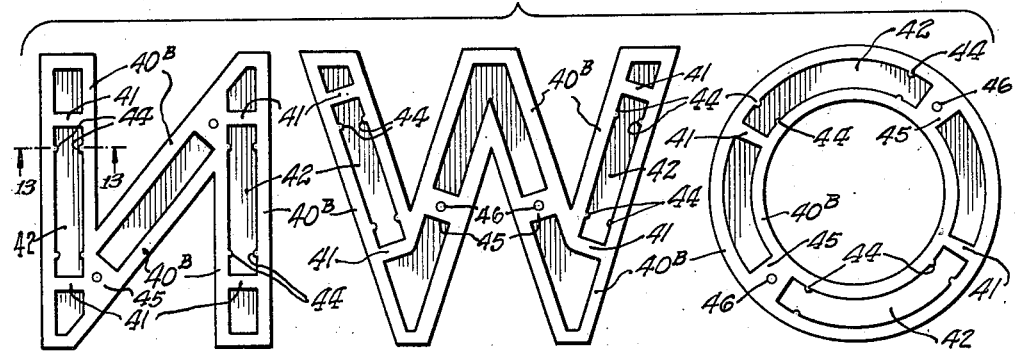
Fig. 12
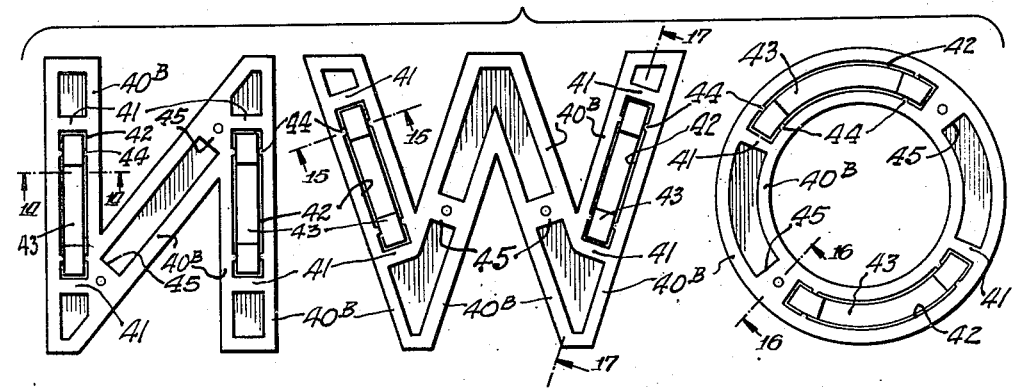
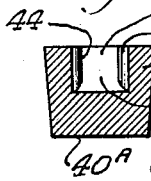 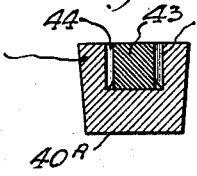 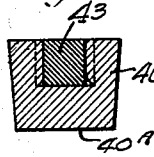 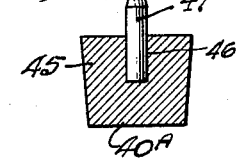
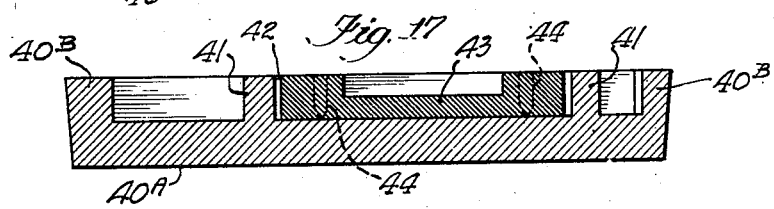
Inventor:
John R. Scharf
By: Frank J. Schraeder Jr.
Attorney.

Patented Sept. 2, 1941

2,254,498

UNITED STATES PATENT OFFICE 2,254,498

MAGNETIC DISPLAY DEVICE AND METHOD OF MAKING SAME

John H. Scharf, Omaha, Nebr., assignor, by mesne assignments, to Quixet, Inc., a corporation of Ohio Application October 5, 1938, Serial No. 233,426

9 Claims. (Cl. 40—142)

This application is a continuation in part of my pending application, Serial Number 101,847, filed September 21, 1936 for Magnetic display signs.

This invention relates generally to magnetic display devices and method of making same and which display devices or signs are adapted for advertising purposes. The invention has particular reference to that class of signs or devices having interchangeable elements as letters, numerals, symbols, illustrations, insignia or the like and wherein the said indicia are provided with magnets for cooperation with a magnetically responsive display board or panel therefor.

I am aware of the fact that the prior art comprising the class of inventions to which my invention is related includes magnetic boards of heavy and expensive construction having a body composed of many adjacently mounted magnets presenting surfaces on which various elements or para-magnetic objects of metal or other material with metallic base may be supported, but in all of such display devices there are objectionable limitations and disadvantages in the excessive weight and cost of such magnet carrying boards and the display elements to be applied thereon and which elements must be either of solid metal or other material provided with a para-magnetic backing. An objection common to the solid metal character or display element having integral or attached magnetic feet is that its weight makes it very difficult to prevent creeping and retainment on the display panel unless provided with many comparatively large and costly magnetic feet, and also that the effect of such display element as being an integral part of the panel is destroyed by the visibility of the extended feet thereof.

It is therefore an object of my invention to increase the efficiency and reduce the cost of magnetically-applied indicia and to adapt same to a wide field of uses and adaptations.

Another object of my invention is to provide a display device including a display board or panel of para-magnetic material such as iron or steel, painted or illustrated, if so desired, in respectively any desirable color or illustration to constitute a supporting back-ground for display elements or instrumentalities of non-magnetic, light-weight and inexpensive thermoplastic material of a cellulose acetate base, or other suitable base, representing different, various or desired indicia and which elements are provided with a small magnet or magnets secured within the body of the element and therewith adapted to be magnetically retained on the display panel on any part thereof or any position thereon relatively to the sides of the panel or other indicia thereon, since the invention provides a panel in which there are no particular magnetic points, areas or fields on which such indicia may be placed for retainment thereon.

Still another object of my invention is to so mount the magnet within the side limits of the body of the indicium that the maximum force of attraction is practically within the central portion of the section of the body in which it is located, and that the longitudinal axis of the magnetic circuit or field is as much as practically possible closely parallel to the longitudinal center line of that portion of the body, and so that such magnetic field extends beyond the opposite sides of such section of the indicium, and further, to so mount the several magnets, as far as practically possible, at balanced points relatively to the center of gravity of the indicium and with the adjacently disposed poles of the different magnets of opposite polarity.

Still another object of my invention resides in the provision of cast or molded indicia of thermo-plastic material each consisting of a very thin-walled, shell-like, hollow body having certain struts formed integrally with and disposed transversely to spaced opposite side walls, and which struts constitute end reenforcing walls for the magnet cavities for resisting deformation or cracking of such opposite side walls upon forceful insertion of the magnets. Such light-weight shell-like indicia are not only low in cost of manufacture but their light weight tends to overcome creeping on vertical surfaces often caused by vibrations transmitted to buildings by railroads or other vehicles. Other struts formed integrally with the side walls may be provided with small holes into which pins may be inserted to thereby adapt such indicia to pin securance upon a wooden or paper back-ground in which adaptation the magnets may be dispensed with.

Other and further objects and advantages of the invention will become apparent from the following detailed description thereof, reference being had to the accompanying drawings showing preferred embodiments of my invention:

Fig. 1 is a fragmentary perspective view of a sign or display device embodying certain features of the present invention;

Fig. 2 is a transverse section taken through the same on line 2—2 of Fig. 1;

Fig. 3 is a detail rear elevation of one of the display elements employed;

Fig. 4 is a detail perspective view, enlarged, of a magnet for mounting in a display element;

Fig. 5 is an enlarged fragmentary perspective view of a portion of a display element in inverted position and showing a magnet mounted therein;

Fig 6 is a longitudinal section taken through the same;

Fig. 7 is an enlarged rear elevation of a display element having the magnet mounted therein;

Fig. 8 is a rear elevation of a display element, showing a slight modification in the construction thereof and of the magnets mounted therein;

Fig. 9 is a transverse section taken through a display element showing a modification of the same and of a magnet mounted therein;

Fig. 10 is a cross-section taken on line 10—10 of Fig. 8 showing supplemental friction producing means;

Fig. 11 is an enlarged rear view of the letters N, W and O made in accordance with preferred embodiments of my invention and before insertion of magnets or pins;

Fig. 12 is a view similar to Fig. 11 but showing the letters N, W and O equipped with magnets;

Fig. 13 is a cross-section taken on line 13—13 of Fig. 11 showing a pair of the small side wall ribs for retaining the magnet;

Fig. 14 is a cross-section taken on line 14—14 of Fig. 12 showing the magnet in place;

Fig. 15 is a cross-section taken on line 15—15 of Fig. 12 showing the magnet and retaining ribs;

Fig. 16 is a cross-section taken on line 16—16 of Fig. 12 showing one of the pins when such letter is adapted for retainment on a wooden or paper back-ground, and Fig. 17 is a cross-section taken on line 17—17 of Fig. 12 showing the magnet in longitudinal section.

Referring now to the drawings, and particularly to Figs. 1 to 10 inclusive, 20 designates a display panel or board which may be of any suitable para-magnetic material, in whole or in part, so as to provide a display board possessing magnetic properties. Covering the face of the board is a ground sheet 21 which may consist of a light coat of paint or colored or illustrated paper or other suitable material capable of being applied, attached or held in place on the board and one which will not interfere with the function of the magnetic properties of the board or body portion 20. A marginal bead or rail 22 may be disposed about the marginal portion of the board 20 against the sheet 21, if desired, and this rail or bead 22 may be of any suitable substance and may be secured in place in any well known manner as by screws to retain the interchangeable sheet 21, or it may, as shown, be constructed of a magnetizable material capable of being held by magnetic attraction in position on the board 20. Thus, the rails 22 may be fixed, detachable or removable and capable of being interchanged with other rails or beads of similar general characteristics to produce different effects at the face of the sign.

The display face of the board 20 is adapted to hold one or more display elements 23. These display elements 23 may be in the form of letters as shown in Fig. 1, or may represent numerals, objects, fanciful configurations, pictorial illustrations, or other suitable indicia desired to be mounted on the board. Each display element or indicium is preferably constructed of a body portion molded, cast or formed of non-magnetic thermo-plastic material such as plastic wood, Bakelite, rubber or compressed fiber and is provided with one or more recesses in its rear face for the reception therein of one or more magnets 24.

The recesses in the rear face of the display element 23 are preferably disposed lengthwise therein with respect to the particular portions of the section of the element in which they are disposed, and the magnets 24, shown in Fig. 4, are preferably of rectangular elongated bar form and may be provided intermediately with a relatively deep notch 25 or elongated recess 25 as shown in Fig. 17, dividing the bar into opposite end poles of opposite polarity and forming a generally U type magnet. The magnet 24 is made of magnetizable or magnetic material and is adapted to cooperate with the para-magnetic board 20 for holding the display elements 23 at any desired position upon the face of the sign.

These magnets 24 may be secured in the element during molding or casting thereof or may be preferably secured in position in the recesses of the display elements by friction or by a filler of plastic or cementitious material 26 capable of holding the magnets 24 within the display element, and the magnet 24 and the cementitious material 26 are positioned or ground or otherwise finished off flush with the rear face of the display element so that the latter may lie flat against the face of the board 20 or its cover 21 and the magnet 24 be exposed thereagainst. The interpositioning of the ground sheet 21 does not effect the magnetic attraction between the board body 20 and one or more magnets 24 of the elements employed, so that the ground sheet 21 may be of any suitable color and may carry any suitable configurations or illustrations such as scenic or pictorial representations of various kind which will blend with or serve the purpose of the various display elements when the latter are positioned on the board and with respect to the representations on the ground sheet.

As shown in Fig. 8, the display element 27, which represents the letter O, may be of circular or other suitable curved configuration and the recesses for the magnets may be correspondingly curved so as to extend lengthwise of or in parallel relation to the particular portions of the display element in which the magnets are disposed. In this instance the magnets 28 are correspondingly curved throughout their length so as to conform to the curved recesses.

As shown in Fig. 9, the magnet 29 may be cast or molded in the rear face of the display element 30 and additionally secured by a dovetail joint with the side portions of the display element 30.

As shown in Figs. 8 and 10, a small body of a friction producing element 31, such as soft rubber, latex, or any other semi-plastic adhesive material, may be placed or secured in the cavity 32 of the display element 27 to thereby increase the friction between the ground 21 and the flattened face 33 of the element 31. This supplemental retaining element 31 could be added to display indicia of the type shown in Figs. 1 to 10 inclusive for use on display signs which might be used on trains where motion or vibration might be transmitted to the sign and thus tend to displace the indicia supported thereon.

In Fig. 7, the displayed element 34 is given the configuration of the letter I, in Fig. 3 the display element 23 is in the form of the letter F, and in Fig. 8 the display element is in the form of the letter O.

It is evident, that the display elements or indicia may be different shapes, sizes and configurations to cooperate with the sign board 20, and of course the display elements may be of various colors and lightweight materials, and may be transparent, opaque or the like, in order to effectively set out the desired display.

The display elements may be molded, cast or otherwise formed as by means of a die, and the recess or recesses in the rear face of the element may be formed in the initial formation of the element. The magnet 24, or 28, may be given any other suitable configuration than as shown for accommodating it to the recess which is provided in the rear face of the display element. As the exposed surfaces of the magnet 24 are disposed substantially flush with the rear face of the display element, the latter fits snugly against the back-ground sheet 21 and imparts to the eye the appearance of being molded or cast as an integral structure with the back-ground or the display board. Of course the display elements may be quickly and readily shifted to various relative positions and interchanged on the face of the board so as to dispose the elements either in a straight line or partially irregular formation as shown in Fig. 1, or in any other suitable arrangement relative to each other. The ground sheet 21 may or may not be used, and it may also be readily interchanged with other different back-grounds to produce different displays.

Referring more particularly to the sheet 21 and Fig. 1, 35 is a representation of trees or hedges imprinted on the face of sheet 21 which may be of suitable green color for providing an appropriate back-ground for the display element 36 which represents a house and which, for example, might be interchanged with another magnetic display element representing, for instance, an apartment building. It will be understood that the element 35 also designates any selected representation of any other thing or object in any colors or otherwise of any desired objects such as a bird, ship, or the like.

It will also be understood that the sheet 21 may consist of ferrous material and have etched or engraved thereon appropriate and desirable displays and that in case the sheet 21 is formed of paper the display elements or indicia will be attracted to the board 20 therethrough and in instances where the sheet 21 is formed of iron or the like that the latter will maintain the indicia also in a selected position, and in either case an interchangeable back-ground is provided appropriate for the particular matter displayed by the indicia.

In Fig. 7 the center line X—X indicates the longitudinal axis of the magnet and its magnetic field which it will be observed illustrates the proper mounting of the magnet 24 relatively to such indicium 34 to thereby secure the following advantages:

(a) The maximum force of attraction is as practically possible at the balance point relatively to the center of gravity of the indicium; and (b) The longitudinal axis of the magnetic field is, as practically possible parallel or nearly parallel, to the longitudinal center line of the indicium (or, in other indicia, to that portion of the section of the indicium in which the magnet is mounted).

In Fig. 3 the magnets 24 are shown, as far as practically possible, at substantially balanced points relatively to the center of gravity of such indicium 23, and the magnets are so mounted that their adjacent poles indicated by N and S are of opposite polarity. This mounting is preferable to that where adjacent poles of adjacent magnets are of like polarity.

In Figs. 11 to 17 inclusive I show, for purposes of illustrating the preferred embodiments of my invention, the letters N, W and O.

Among the features of my invention are the thin display face 40$^A$ and side walls 40$^B$ which define the hollow indicia and the struts 41 which are formed integrally with the display face wall 40$^A$ and a pair of spaced side walls 40$^B$ and which struts or cross-walls 41 extend transversely, and preferably at a right-angle, to the spaced side walls 40$^B$ and at the ends of the cavities 42 for the magnets 43. The distance between the reenforcing cross-walls 41 defining the ends of the magnet cavity 42 is only slightly longer than the magnet 43 and the portions of the side walls 40$^B$ defining the magnet cavity 42 are each provided on their inner faces, and preferably near the transverse reenforcing walls 41, with a pair of integral spaced small ribs 44 preferably disposed transversely to the plane of the display face 40$^A$. The distance between a pair of such small oppositely disposed ribs 44 is slightly less than the width of the magnet. The thickness of the display face wall 40$^A$ is about $5/64$ of an inch and that of the side walls 40$^B$ is about $1/32$ of an inch.

The thickness of the struts 41 is preferably about $3/64$ of an inch and cross walls 45 formed with a small hole 46 adapted to receive therein a pin 47 may also be provided to thereby adapt the use of such display elements as a pin element for support on a back-ground of wood or paper in which case the magnets of course are not employed in such element. The display elements so made of a light-weight thermoplastic material of such thin walls weigh comparatively very little, can be manufactured at comparatively low cost and may be easily retained by the magnets against displacement.

The letters N and W shown in Figs. 11 and 12 are provided with separate walls 45 for the pins 47 but these pin-retaining walls 45 may be combined with certain of the reenforcing struts 41 as indicated by numeral 46 in the letter O shown in Figs. 11 and 12.

My improved and preferred method of making magnetic display elements from light-weight thermoplastic material, such as Bakelite or tenite consists in molding or otherwise forming the display element, then heating a metallic element adapted to be magnetized to a sufficient temperature, about 300° F. for tenite or to about the melting point of the display element material, and then forcibly inserting such heated metallic element between the opposing ribs 44 until the pole ends of such metallic element are substantially flush with the back or rear face of the display element, then abrasively surfacing the display element and pole ends of the metallic element so that same lie in substantially a true plane and then magnetizing the metallic element with opposite pole characteristics.

Heating the metallic element will cause a slight softening of the outer portions of the ribs 44 which contact with the metallic element to thereby more securely frictionally retain such metallic element against displacement.

Due to the fact that the magnets 43 are small in size ranging in lengths from ¼ to ½ of an inch for display sign letters and numerals up to two inches in height I have found that the above method has advantages over a method wherein already magnetized magnets are inserted in the display element and thereafter attempted to be plane-aligned or surfaced. By my method of surfacing the unmagnetized metallic element, the filings do not stick to the metallic element as they would if it was magnetized, and furthermore, the handling of the larger complete display element with the metallic elements therein facilitates the magnetizing operation of the magnets as compared to the manual and individual handling of such small metallic elements. I have also found, as above pointed out, that the surfacing operation of the display element with the unmagnetized magnet elements can be done more economically either by individual manual surfacing or group surfacing or by a traveling belt conveyor having slotted receptacles thereon in which groups of such display elements are carried past a rotary abrasive surfacing element.

Due to the small cross-section of the rounded retaining ribs 44 the unmagnetized magnet element may be forcibly inserted into place between such sets of ribs 44 under normal temperature without preheating, for frictional retainment therebetween, whereupon the rear face of the element and the unmagnetized element may be surfaced and plane-aligned and finally the metallic element may be magnetized.

In both of the above methods of hot and cold magnet insertion, it may be pointed out that the rear face of each of the display elements is thoroughly brushed after the abrasive surfacing operation to remove all loose particles before magnetization of the magnet element.

The above methods may be applied to the making of the indicia illustrated in Figs. 1 to 10 inclusive.

Preferably a light-weight, non-magnetic thermoplastic material such as Bakelite or tenite, or plastic wood may be used for the indicia and the walls are of a minimum thickness, about $\frac{3}{32}$ of an inch, whereby a comparatively small magnet may be employed, the latter preferably being made of cobalt steel material which provides an efficient permanent magnet although because of its small size is comparatively expensive, as in the practice of the invention very small bars thereof may be used for providing the magnet, such bars being so small that they are not susceptible of being drilled for attachment to the indicia with rivets or the like.

Throughout the specifications and claims the word "indicium" is broadly understood to include any indicia or concrete representation of any visible object or thing such as, for example, a letter, numeral, pictorial illustration, trade-mark or symbol. The indicia being preferably formed of a hardened plastic or semi-plastic material.

I do not wish to be restricted to the size, form and proportions of the various parts, and obviously changes could be made in the construction herein described without departing from the spirit of the invention, it being only necessary that such changes fall within the scope of the appended claims.

I claim:

1. The method of making a thermoplastic display indicium provided with a magnet adapting the indicium to be magnetically supported on a board of para-magnetic material which consists in the steps of molding or otherwise forming the indicium with a recess in its rear face, then inserting a metallic element in the recess of the rear face thereof, then surfacing the rear face of the indicium to produce a plane-aligned face, and then magnetizing the metallic element.

2. The method of making a thermoplastic display indicium provided with a magnet adapting the indicium to be magnetically supported on a board of para-magnetic material which consists in the steps of molding or otherwise forming the indicium with a recess in its rear face, then heating a metallic element and while so heated inserting such metallic element between opposed wall portions of said recess within the rear face of the indicium, then surfacing the rear face of the indicium and said element, and then magnetizing the metallic element so that its opposite ends have opposite magnetic pole characteristics.

3. The method of making a thermoplastic display indicium of very thin-walled shell-like structure having a pair of spaced ribs formed integrally with spaced wall portions thereof and provided with a magnet held between said ribs adapting the indicium to be magnetically supported on a board of para-magnetic material which consists in the steps of molding or otherwise forming the indicium with a recess and a pair of spaced ribs extending transversely to the side walls of the indicium, then heating a metallic element to substantially the melting point of the thermoplastic material and while heated inserting said metallic element within the recess in the rear face of the indicium between said ribs to thereby cause a softening of said ribs and frictional retainment of said metallic element between said ribs, then abrasively surfacing the metallic element into plane-alignment with the rear face of the indicium, then brushing the loose particles from the indicium, and then magnetizing the metallic element.

4. A display device formed of non-magnetic thermoplastic material comprising a thin-walled hollow structure including a display surface wall formed integrally with side walls defining the structure, said side walls having rear plane-aligned portions adapted to bear against a display board of para-magnetic material, a pair of spaced intermediate walls disposed transversely to said side walls defining a magnet cavity, and a bar magnet in said cavity with magnetic portions thereof approximately flush with said side wall plane-aligned portions, and means for securely retaining the magnet in said cavity.

5. A display device formed of non-magnetic thermoplastic material comprising a thin-walled hollow structure including a display surface wall formed integrally with said side walls defining the structure, said side walls having rear plane-aligned portions adapted to bear against a display board of para-magnetic material, a pair of spaced intermediate walls disposed transversely to said side walls defining a magnet cavity, portions of the inner faces of opposite side walls defining said magnet cavity having integral oppositely disposed ribs, and a bar magnet in said cavity frictionally retained between said ribs, the magnetic face portions of said magnet being plane aligned with the rear plane-aligned portions of said side walls.

6. A shell-like display device of non-magnetic material of comparatively thin wall section having a display surface and side walls adapted to bear against a display board of para-magnetic material, said display device having an open cavity defined by the side walls and a pair of spaced opposed ribs between the side walls of the device, and a bar magnet frictionally held in said cavity between opposed ribs of the side walls and with a face of said magnet approximately flush with the abutting edges of the side walls, said magnet having the sides thereof slightly spaced from the adjacent inner faces of the side walls of the cavity of the display device.

7. The combination of a display board of paramagnetic material, a shell-like hollow display device on the face of said board of non-magnetic material having a display surface and side walls adapted to bear against the face of the board, said display device having an elongated cavity in the rear face thereof extending throughout the entire body of the display device, a bar magnet secured in said cavity with a face thereof approximately flush with the rear edges of said side walls, and a pair of spaced transverse walls of comparatively greater thickness than said side walls formed integrally with said side walls.

8. A display device formed of non-magnetic thermoplastic material comprising a thin-walled hollow structure including a display surface wall formed integrally with side walls defining the structure, said side walls having rear plane-aligned portions adapted to bear against a display board of para-magnetic material, a pair of spaced intermediate walls of substantially greater thickness than the side walls of the structure disposed transversely to said side walls, and a bar magnet frictionally held between the side walls of the device with magnetic portions thereof approximately flush with said side wall plane-aligned portions.

9. A shell-like display device of non-magnetic material comprising a wall constituting a display surface, continuous side walls formed integrally with said display surface wall, said side walls and display surface wall being of comparatively thin section and defining a hollow chamber open on the rear face of the device and the rear edges of said side walls being disposed in plane-alignment adapted for mounting on a display board, and a transverse wall of comparatively greater thickness than said side walls formed integrally with spaced side wall portions, said display device being adapted for mounting upon a paramagnetic display board by the insertion of one or more magnets within said hollow chamber for frictional retainment between spaced portions of said side walls.

JOHN H. SCHARF.